US012810514B2

(12) United States Patent
Grass et al.

(10) Patent No.: US 12,810,514 B2
(45) Date of Patent: Nov. 24, 2026

(54) PROCESSING PROJECTION DATA PRODUCED BY A COMPUTED TOMOGRAPHY SCANNER

(71) Applicant: KONINKLIJKE PHILIPS N.V., Eindhoven (NL)

(72) Inventors: Michael Grass, Buchholz in der Nordheide (DE); Christian Wuelker, Hamburg (DE); Thomas Heiko Stehle, Hamburg (DE); Roland Proksa, New Wulmstorf (DE); Thomas Koehler, Norderstedt (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 194 days.

(21) Appl. No.: 18/719,891

(22) PCT Filed: Dec. 8, 2022

(86) PCT No.: PCT/EP2022/084905
§ 371 (c)(1),
(2) Date: Jun. 14, 2024

(87) PCT Pub. No.: WO2023/117447
PCT Pub. Date: Jun. 29, 2023

(65) Prior Publication Data

US 2025/0054209 A1 Feb. 13, 2025

Related U.S. Application Data

(60) Provisional application No. 63/291,498, filed on Dec. 20, 2021.

(30) Foreign Application Priority Data

Mar. 9, 2022 (EP) .................................... 22161022

(51) Int. Cl.
*G06T 12/20* (2026.01)
*G06T 3/4053* (2024.01)

(52) U.S. Cl.
CPC ............ *G06T 12/20* (2026.01); *G06T 3/4053* (2013.01); *G06T 2211/441* (2023.08)

(58) Field of Classification Search
CPC ....... G06T 12/10; G06T 12/20; G06T 3/4053; G06T 2211/00; G06T 2211/441;
(Continued)

(56) References Cited

U.S. PATENT DOCUMENTS 4,637,040 A 1/1987 Sohval
6,411,670 B1 * 6/2002 Besson .................. A61B 6/027 378/4
(Continued)

FOREIGN PATENT DOCUMENTS

EP 3447731 A1 2/2019

OTHER PUBLICATIONS

PCT International Search Report, International application No. PCT/EP2022/084905, Mar. 28, 2023.

*Primary Examiner* — Prabodh M Dharia
(74) *Attorney, Agent, or Firm* — Larry Liberchuk

(57) ABSTRACT

A mechanism for processing projection data generated by a computed tomography scanner. The projection data is processed by a machine-learning algorithm trained to perform an upsampling or super-resolution technique on input data in order to generate higher resolution projection data.

13 Claims, 6 Drawing Sheets

(58) Field of Classification Search
CPC . G06T 2207/10081; G06T 2207/20081; G06T 2207/20084; G06T 2207/30004; A61B 6/032; A61B 6/4085; A61B 6/5105
USPC ...................... 345/418; 378/4, 8, 19; 382/31
See application file for complete search history.

(56) References Cited

U.S. PATENT DOCUMENTS

| | | | | |
|---|---|---|---|---|
| 2004/0081279 | A1 | 4/2004 | Brunnett | |
| 2006/0233295 | A1* | 10/2006 | Edic | A61B 6/032 378/4 |
| 2008/0056432 | A1* | 3/2008 | Pack | G06T 12/10 378/4 |
| 2008/0247507 | A1* | 10/2008 | Shechter | G01T 1/2985 378/19 |
| 2008/0267344 | A1* | 10/2008 | Koehler | A61B 6/032 378/8 |
| 2010/0272342 | A1* | 10/2010 | Berman | A61B 6/032 382/131 |
| 2013/0051519 | A1 | 2/2013 | Yang | |
| 2018/0018757 | A1* | 1/2018 | Suzuki | G06T 3/4053 |
| 2019/0139276 | A1 | 5/2019 | Lee | |
| 2019/0251713 | A1 | 8/2019 | Chen | |
| 2019/0350539 | A1* | 11/2019 | Guo | A61B 6/032 |
| 2020/0111194 | A1 | 4/2020 | Wang | |
| 2020/0380737 | A1* | 12/2020 | Bao | G06T 5/70 |
| 2021/0007694 | A1* | 1/2021 | Hein | A61B 6/5205 |
| 2021/0383582 | A1 | 12/2021 | Bernard | |
| 2022/0035961 | A1* | 2/2022 | Ziabari | G06F 30/10 |
| 2023/0127194 | A1* | 4/2023 | Pichumani | G01N 23/046 382/149 |

* cited by examiner

PROCESSING PROJECTION DATA PRODUCED BY A COMPUTED TOMOGRAPHY SCANNER

TECHNICAL FIELD

The present disclosure relates to the field of medical imaging and, in particular, to the field of processing projection data produced by a computed tomography scanner.

BACKGROUND INFORMATION

Computed tomography (CT) scanners are well-established medical imaging devices that use a detector arrangement, formed of an array of detectors or pixels, to detect an interaction between X-ray radiated energy and irradiated material in order to generate medical imaging data.

There is an ongoing interest to increase the resolution of images produced by a CT scanner, whilst maintaining a quality of the images. Techniques for improving the resolution of CT scanning include scanning an object with a small focal spot, a small detector/pixel size, and sufficient sampling in both angular and radial directions.

In particular, radial sampling has a significant impact on the resolution of images produced by a CT scanner. For detector arrangements that have a detector/pixel size of w in the fan-direction (projected to iso-center), the resolution limit related to the averaging of intensity over the pixel size is $f_w=1/w$, since this is the spatial frequency where convolution of the signal over the pixel width has its first zero-crossing. As the detector/pixel spacing roughly matches the detector/pixel size (ignoring any spacers between pixels), the Nyquist frequency related to the radial sampling is therefore only in the order of $f_s=\frac{1}{2}w$. For a typical CT system, $f_w\approx 13$ lp/cm and $f_s\approx 6.5$ lp/cm (where lp refers to line pairs). Without any further technical effort, the spatial resolution is therefore limited by the radial sampling, as any attempts to reconstruct images with frequency components above $f_s$ lead to aliasing artefacts.

One known approach to overcoming this issue is to use a dual focal spot (DFS) acquisition, where the focal spot of the x-ray tube is deflected along the source path. Through appropriate selection of the distance, the radial sampling pattern is shifted by half a detector/pixel spacing for every other view. Parallel rebinning allows the data from the two focal spot positions to be interleaved (e.g. to form a single view), and the resulting Nyquist frequency of the radial sampling matches the resolution limit related to the pixel size.

Another sampling condition that should be adhered to is that classical sampling theory requires to measure $N\pi/2$ angular samples over 1800 if an N×N image is to be reconstructed, which results in roughly 800 angular samples for the typically used 512×512 image size.

There is a desire to further improve the resolution of images and allow high-resolution images to be produced for various forms of CT imaging modality.

European Patent Application having publication number EP 3 447 731 A1 discloses an approach for generating an enhanced tomographic image of an object.

US Patent Application having publication number US 2013/051519 A1 discloses an approach for increasing a resolution of 2D projection images for a cone-beam computer tomography data.

SUMMARY

The invention is defined by the claims.

According to examples in accordance with an aspect of the invention, there is provided a computer-implemented method of processing projection data generated by a computed tomography scanner.

The computer-implemented method comprises: obtaining the projection data generated by the computed tomography scanner; processing the projection data using a machine-learning algorithm configured to perform a super-resolution imaging technique on the projection data, to increase the apparent sampling of the projection data in at least one dimension; and outputting the processed projection data.

The machine-learning algorithm is trained using a training dataset, the training dataset comprising: an input training dataset formed of a plurality of input training data entries that each comprise low resolution projection data of an imaged subject; and an output training dataset formed of a plurality of output training data entries, each output training data entry corresponding to a respective input training data entry, and comprising high resolution projection data of the same imaged subject of the respective input training data entry.

The high resolution projection data of each output training data entry is generated by a training computed tomography scanner that generates high resolution projection data by: using a dual focal spot acquisition technique to generate the intermediate data, the intermediate data comprising interleaved first sample sets and second sample sets, each sample set obtained using a different focal spot; and performing parallel binning on the interleaved first sample sets and second sample sets to generate the high resolution projection data.

The low resolution projection data is generated by discarding the first sample sets or the second sample sets of the intermediate data. Thus, only the first sample sets or only the second sample sets form the low resolution projection data.

The proposed approach thereby makes use of a machine-learning algorithm to improve a resolution and/or apparent sampling of the projection data. It has been herein recognized that a machine-learning algorithm can be advantageously trained to increase a resolution of projection data.

The use of a machine-learning algorithm can be used to supplement and/or replace one or more resolution improving techniques known in the art, such as DFS acquisition. This is particularly advantageous in scenarios in which such previously known techniques are difficult to implement during an imaging procedure. By way of example, if kVp switching is performed, then a DFS technique is difficult to implement technically.

In particular, the machine-learning algorithm is effectively trained to emulate a dual focal spot acquisition technique. This means that the benefits of DFS techniques can be employed even in circumstances where true performance of such techniques would be difficult, e.g. when performing kVp switching.

This approach is advantageous over other forms of generating a training dataset, as it does not introduce artificial noise in order to generate the low resolution projection data (e.g., as would result from using a blurring or down-sampling technique) nor does it require the deletion of data from obtained projection data for clinically representing a scene. Moreover, the low resolution projection data continues to represent clinically useful and relevant medical information, improving the relevance and accuracy of the super-resolution performed by the machine-learning method.

The machine-learning algorithm may be configured to increase the apparent sampling of the projection data in the radial direction. In some examples, the machine-learning algorithm is configured to increase the apparent sampling of the projection data in the angular direction. Of course, in yet other examples, the machine-learning algorithm increases the apparent sampling in both directions.

The projection data may be projection data generated by the computed tomography scanner using a dual focal spot acquisition approach.

In at least one example, the machine-learning algorithm is further trained using a modified training dataset, the modified training data set comprising: a modified input training dataset, in which noise is added to the low-resolution projection data of each input training data entry of the training dataset; and the output training dataset of the training dataset. This introduces robustness to noise for the machine-learning algorithm, so that the machine-learning algorithm is trained for performing both a denoising and a super-resolution procedure.

In some examples, the projection data comprises a plurality of samples, each associated with a different combination of values for a parameter r and an angle $\phi$; the parameter r represents a smallest distance between an iso-center of the computed tomography scanner and a ray of radiation used by the computed tomography scanner to generate the sample; the angle $\phi$ represents an angle between the ray of radiation used by the computed tomography scanner to generate the sample and a predefined plane; the machine-learning algorithm is configured to generate a plurality of new samples for the projection data; each new sample is generated from a different subset of the plurality of samples, wherein the subset comprises only those samples for which: an absolute difference between the value for parameter r of the sample and the value for parameter r of the new sample falls below a first predetermined threshold; and/or an absolute difference between for the value of angle $\phi$ of the sample and the value of angle $\phi$ of the new sample falls below a second predetermined threshold.

This approach effectively limits or reduces a size of a receptive field when processing the projection data. It has been recognized that the most valuable information, particularly in CT projection data, for predicting new projection samples is found from nearby existing projection samples. Limiting the size of receptive field thereby increases an efficiency of processing the projection data using the machine-learning algorithm.

In some examples, the machine-learning algorithm is further trained using a second training dataset, the second training dataset comprising: a second input training dataset formed of a plurality of second input training data entries that each comprise low resolution image data of a scene; and a second output training dataset formed of a plurality of second output training data entries, each second output training data entry corresponding to a respective second input training data entry, and comprising high resolution image data of the same scene of the respective second input training data entry.

This embodiment recognizes that machine-learning methods that have been trained to perform super-resolution imaging or upsampling of image data (e.g. images) can be repurposed or designed for performing super-resolution on projection data. This means that existing databases of image data (of high and low resolutions) can be exploited to provide a large databank of examples for accurate upsampling.

The image data is preferably non-projection image data. This approach recognizes that standard super-resolution machine-learning methods can achieved improved resolution of projection data.

Preferably, the values of the low-resolution image data and the high-resolution image data are scaled to correspond to a range of possible values for projection data generated by the computed tomography scanner. This embodiment provides more relevant training data designed for improving the resolution of projection data.

There is also proposed a computer-implemented method of generating a training dataset for training a machine-learning algorithm is perform a super-resolution imaging technique on projection data generated by a computed tomography scanner.

The computer-implemented method comprises: generating an output training dataset, formed of a plurality of output training data entries that each comprise high resolution projection data of an imaged subject, for the training dataset by: receiving intermediate data generated by a training computed tomography scanner that uses a dual focal spot acquisition technique to generate the intermediate data, the intermediate data comprising interleaved first sample sets and second sample sets, each sample set obtained using a different focal spot; and performing parallel binning on the interleaved first sample sets and second sample sets to generate the high resolution projection data.

The computer-implemented method also comprises generating an input training dataset formed of a plurality of input training data entries, each input training data entry corresponding to a respective output training data entry and comprising low resolution image projection data of the same image subject of the respective output training data entry, by discarding the first sample sets or the second sample sets of the intermediate data.

In preferred examples, the step of generating an output training dataset further comprises controlling the training computer tomography using a dual focal spot acquisition technique to generate the intermediate data.

There is also proposed a non-transitory computer program product comprising computer program code which, when executed on a computing device having a processing system, cause the processing system to perform all of the steps of any herein described method.

There is also proposed a processing system for processing projection data generated by a computed tomography scanner, the processing system being configured to: obtain the projection data generated by the computed tomography scanner; process the projection data using a machine-learning algorithm configured to perform a super-resolution imaging technique on the projection data, to increase the apparent sampling of the projection data in at least one dimension; and output the processed projection data.

There is also proposed an imaging system comprising: the processing system and the computed tomography scanner.

These and other aspects of the invention will be apparent from and elucidated with reference to the embodiment(s) described hereinafter.

BRIEF DESCRIPTION OF THE DRAWINGS

For a better understanding of the invention and to show more clearly how it may be carried into effect, reference will now be made, by way of example only, to the accompanying drawings, in which.

DETAILED DESCRIPTION

Figure 1:
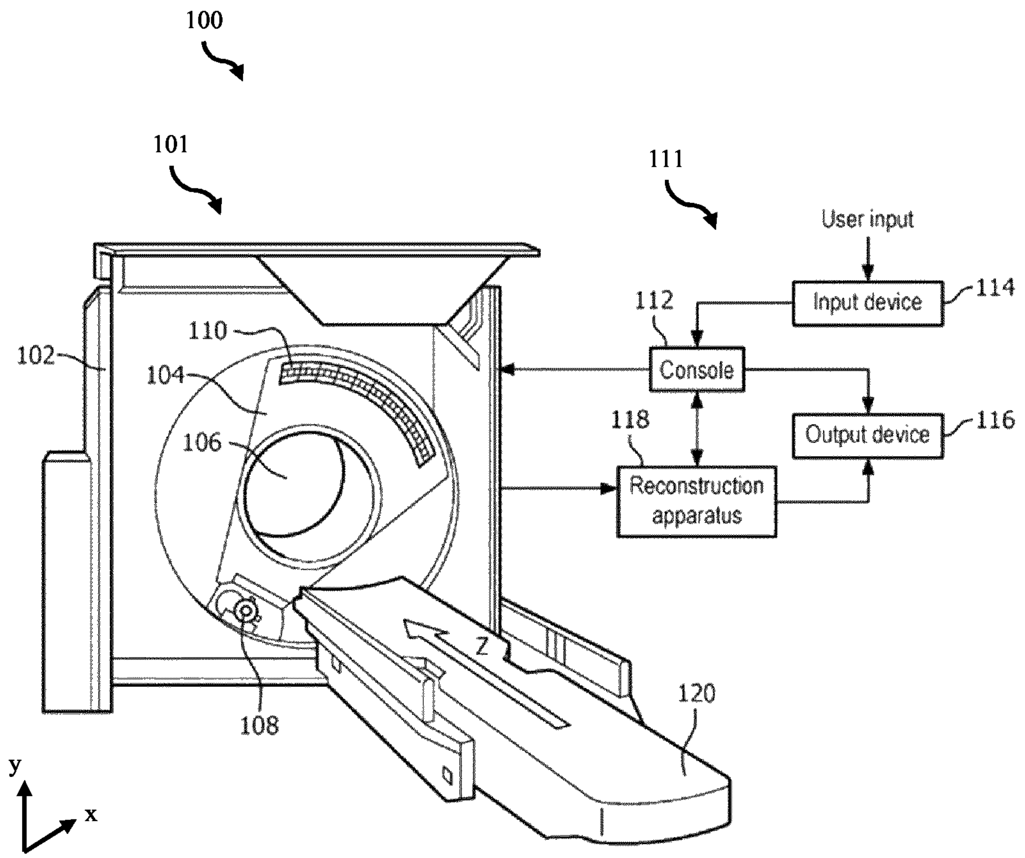
FIG. 1 illustrates an imaging system.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The present disclosure provides a mechanism for processing projection data generated by a computed tomography scanner. The projection data is processed by a machine-learning algorithm trained to perform an upsampling or super-resolution technique on input data in order to generate higher resolution projection data.

Approaches are based on the realization that a machine-learning algorithm can be appropriately trained to upsample or improve a resolution of projection data. This reduces a need to modify an imaging technique or computed tomography scanner to provide projection data of a higher resolution. Embodiments could, for instance, be employed to provide high quality projection data even when other sampling/resolution improvement techniques cannot be performed.

Embodiments may be employed in any imaging system having a computed tomography scanner, such as those used in clinical or healthcare environments.

FIG. 1 illustrates an imaging system 100 and, in particular, a computed tomography (CT) imaging system, in which embodiments of the present invention can be employed. The CT imaging system comprises a CT scanner 101 and processing interface 111, which processes and performs actions using data generated by the CT scanner.

The CT scanner 101 includes a generally stationary gantry 102 and a rotating gantry 104. The rotating gantry 104 is rotatably supported by the stationary gantry 102 and rotates around an examination region 106 about a longitudinal or z-axis. An x-axis may be defined as lying perpendicular to the z-axis and in a horizontal plane (e.g., perpendicular to gravity). A y-axis may also be defined as lying perpendicular to the z-axis and the x-axis, i.e., a vertical axis or an axis aligned with gravity.

A patient support 120, such as a couch, supports an object or subject such as a human patient in the examination region 106. The support 120 is configured to move the object or subject for loading, scanning, and/or unloading the object or subject.

A radiation source 108, such as an x-ray tube, is rotatably supported by the rotating gantry 104. The radiation source 108 rotates with the rotating gantry 104 and emits radiation that traverses the examination region 106.

A radiation sensitive detector array 110 subtends an angular arc opposite the radiation source 108 across the examination region 106. The detector array 110 includes one or more rows, e.g. two or more rows, of detectors that extend along the z-axis direction, and detects radiation traversing the examination region 106, and generates projection data indicative thereof. The projection data may, for instance, be cone-beam projection data. Each detector represents a pixel of the detector array.

As the rotating gantry rotates, the detector array captures a series of sample sets of received radiation. Each sample set represents a projection data portion for a different view. More specifically, a single view represents a projection data portion obtained when the radiation source is at a single position. The projection data portions from different views can be combined, e.g. concatenated together, to form the projection data provided by the detector array. In this way, the projection data comprises a plurality of samples, each sample being captured by a detector at a different location with respect to the examination region. The plurality of samples can be divided into a plurality of sample sets, each sample set containing samples captured at a different projection view.

The angular increment of the rotation of the rotating gantry between different projection views, i.e. the capture of different sample sets by the detector array, is called the angular sampling density.

The processing interface 111 processes the projection data generated by the CT scanner. The processing interface 111 may also facilitate user control over the operation of the CT scanner.

In particular, the processing interface may comprise a general-purpose computing system or computer that serves as an operator console 112 and includes an input device(s) 114, such as a mouse, a keyboard, and/or the like and an output device(s) 116, such as a display monitor, a filmer or the like. The console 112 allows an operator to control operation of the system 100. Data generated by the processing interface can be displayed through at least one display monitor of the output device(s) 116.

The processing interface makes use of reconstruction apparatus 118 to process the projection data and reconstruct image data, e.g. for display at the output device 116 or for storage at an external server or database. It is to be appreciated that the reconstruction apparatus 118 can be implemented through a microprocessor(s), which executes a computer readable instruction(s) encoded or embed on computer readable storage medium, such as physical memory and other non-transitory medium. Additionally or alternatively, the microprocessor(s) can execute a computer readable instruction(s) carried by a carrier wave, a signal and other transitory or non-transitory medium.

The reconstruction apparatus 118 may employ a filtered-backprojection (FBP) reconstruction, an image domain and/or projection domain reduced noise reconstruction algorithm (e.g., an iterative reconstruction), and/or other algorithm for performing reconstruction.

Figure 2:
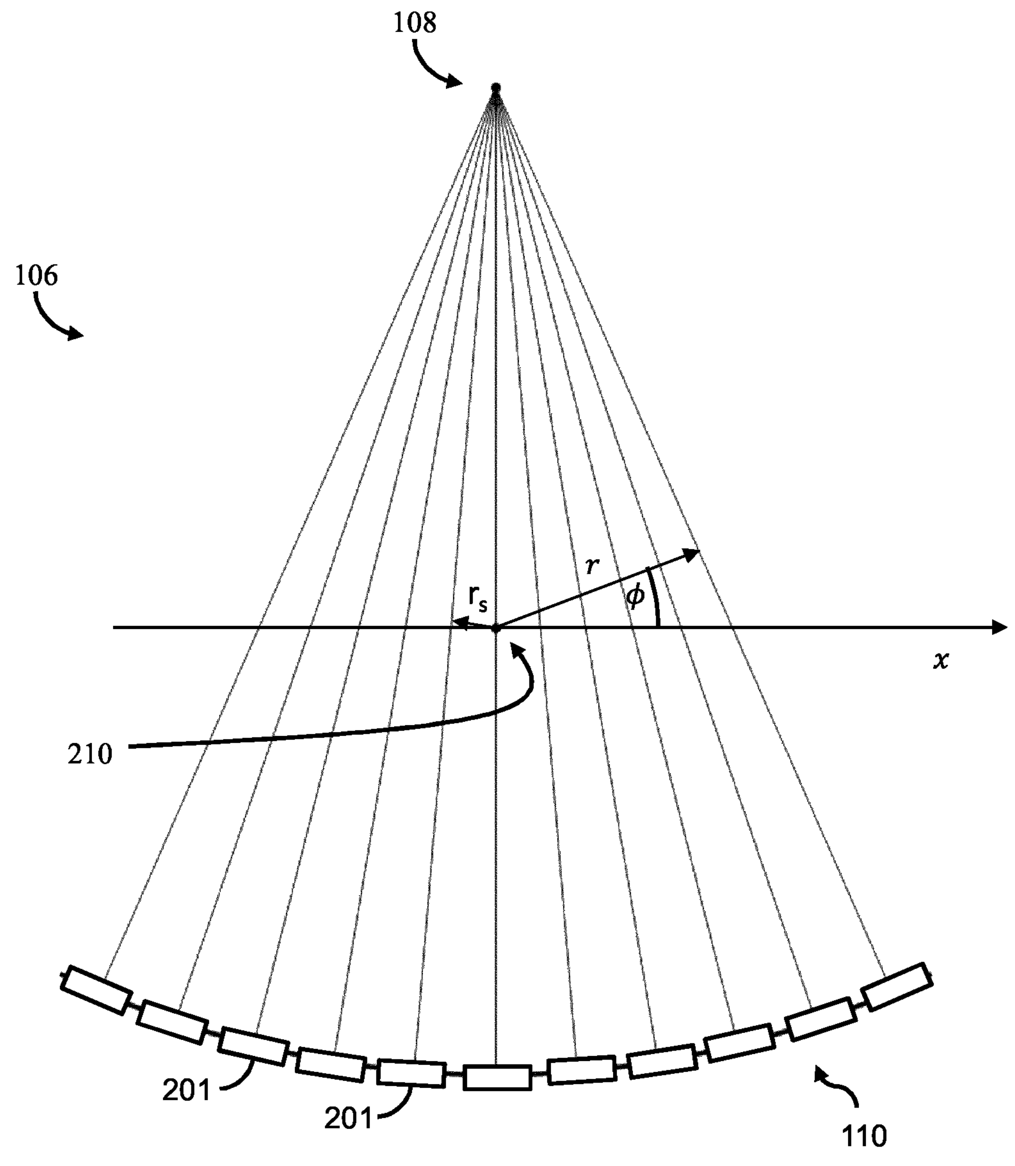
FIG. 2 conceptually illustrates radiation output by a radiation source of a computed tomography scanner.

FIG. 2 illustrates radiation traversing an examination region for understanding nomenclature used throughout this disclosure.

More particularly, FIG. 2 illustrates a plurality of rays emitted by a radiation source 108. Each ray represents a ray of radiation that is incident upon a different detector 201 of the detector array 110.

Each ray from the radiation source 108 to a detector 201, and the sample generated by the detector in response to this ray, is characterized by its r and ϕ value.

The parameter r represents a distance of the ray to the iso-center 210 of the computed tomography system 106. The iso-center 210 represents the center of the area around which the rotating gantry of the computed tomography system rotates, i.e. the center of rotation. In particular, the parameter r represents a distance of a hypothetical line connecting the iso-center 210 to a ray, wherein the hypothetical line is connected perpendicularly to the ray.

The angle ϕ represents the angle of the ray from the x-axis. In particular, the angle ϕ represents an angle between the hypothetical line connecting the iso-center 210 to a ray, wherein the hypothetical line is connected to the x-axis and perpendicularly to the ray.

For convenience, the distance of parameter r is often considered negative for rays of the left half of the detector array, e.g. from a predefined perspective at the front of the CT scanner.

The radial sampling density, often called just radial sampling, is defined as the difference of the radial values r associated with neighboring detectors of the detector array. Thus, if one of the rays of radiation passes through the iso-center 210, as illustrated in FIG. 2, the radial sampling density will be the distance $r_s$ or length of a second hypothetical line that connects the iso-center and the nearest ray not passing through the iso-center, wherein the second hypothetical line is perpendicular to said nearest ray.

Figure 3:
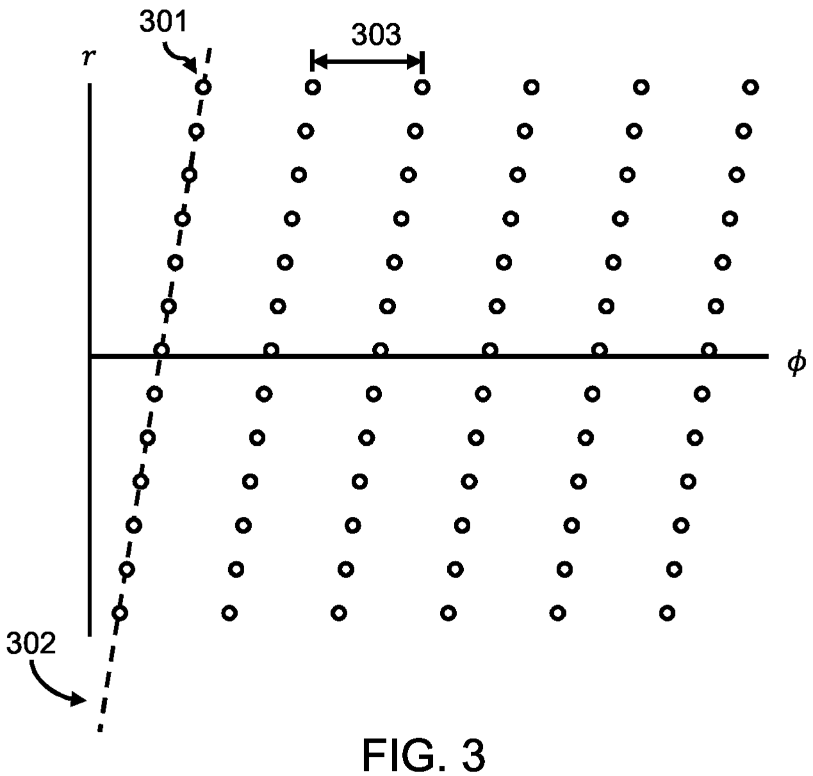
FIG. 3 conceptually illustrates projection data generated by a computed tomography scanner.

FIG. 3 conceptually illustrates samples contained in projection data.

It will be appreciated that each sample taken by detector of the detector array is associated with a different value for parameter r and angle ϕ. Thus, it is possible to plot the samples of the projection data in an rϕ-space, as illustrated. Each sample 301 is schematically illustrated using a circle.

Samples captured at a same time, i.e. for a same effective projection view, belong to same sample set and lie upon a same slanted line 302. A different sample set is captured when the projection view changes, i.e., after the rotating gantry has rotated. This means that an angular sampling density 303 can also be derived based on a difference in the value for angle ϕ between two neighboring samples that have a same value for r, i.e., represent samples captured at consecutive time steps by a same detector of the detector array.

The present invention relates to an approach for improving the resolution of image data, i.e. images, generated by a computer-tomography scanner. It will be immediately apparent that the greater the resolution of the projection data, the greater the resolution of image data reconstructed from the projection data.

In particular, the present invention may provide an approach for increasing an apparent sampling of the detector array, e.g. by adding, inserting or interpolating additional samples to the projection data.

Existing approaches for improving the resolution of image data have focused upon improving the sampling density when generating the projection data.

Some approaches that could be adopted include decreasing a spacing between detectors of the detector array and/or decreasing the size of detectors in the detector array to allow a greater number of detectors to fit into same area. An increased number of detectors in a same size detector array will have a natural consequence of increased sampling density by the detector array. However, smaller detector sizes are more costly to manufacture and more costly to handle, e.g. because additional bandwidth between the gantry and the processing interface is needed. Alternative approaches would therefore be preferable.

Another approach is to use a dual focal spot (DFS) acquisition. In a DFS acquisition technique, the focal spot of the radiation source can be deflected along the source path. Through appropriate selection of the distance of the deflection, it is possible to shift a sampling pattern, in the radial direction, by half a pixel spacing for every other sample taken by the detector array. Thus, two sample sets are taken for each rotation of the rotating gantry, with different focal spots. Parallel rebinning allows the data from two focal spot positions to be interleaved. This forms, for a single view, a projection data portion from two consecutive samples taken by the detector array. This will effectively increase the sampling density in a radial direction.

A more complete explanation of the parallel rebinning process, and the DFS acquisition approach more generally, is provided by the U.S. Pat. No. 4,637,040.

Figure 4:
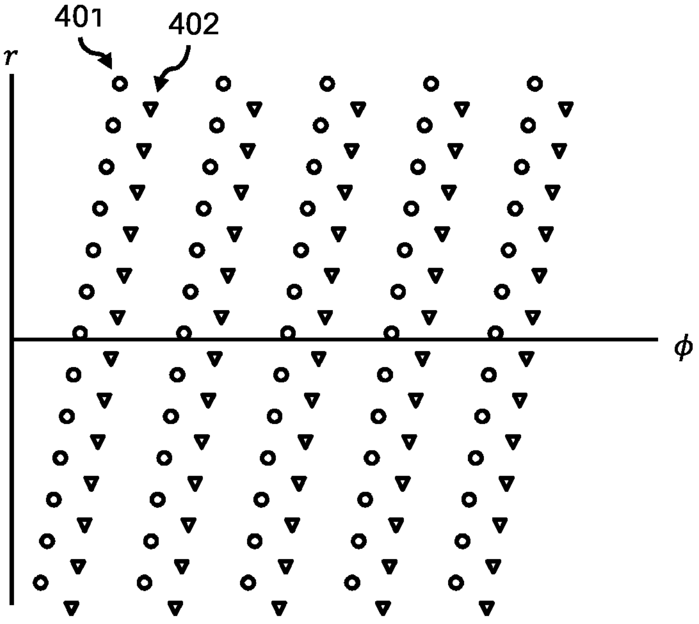
FIG. 4 conceptually illustrates projection data generated by a computed tomography scanner using a dual focal spot acquisition technique.

FIG. 4 conceptually illustrates raw samples contained in projection data for a CT scanner that operates using a DFS acquisition process.

As previously explained, under DFS acquisition, at consecutive rotation angles of the rotating gantry, two sample sets are obtained. A first sample set 401 is illustrated with circles, and a second sample set 402 is illustrated with triangles. Thus, first sample sets are interleaved with second sample sets. Put another way, a pair of sample sets are obtained.

The first and second sample sets then undergo parallel rebinning. This approach may effectively move each sample in pairs of first and second sample sets to have a same angle ϕ, or to lie upon a single slanted line in the rϕ-space rather than two slanted lines. In this way, within each pair of first and second sample sets, the first and second sample sets are combined to produce a combined sampling set representing a single projection view. This approach would effectively decrease an angular sampling density of the projection data, whilst increasing an effective radial sampling of any given sampling set. This is because the total number of sampling sets, of samples lying along a same line, is reduced, whilst the number of samples per sampling set is increased.

A comparison between FIGS. 3 and 4 demonstrates how the effective radial sampling could be increased when DFS is performed.

Of course, a combination of any of the above-described these approaches could be performed.

The proposed approach provides an alternative mechanism for increasing the effective sampling or resolution of the projection data, which could be used instead of or alongside pre-existing approaches, such as those previously described. In particular, embodiments of the present invention may be configured to effectively provide supplementary samples to those contained in the projection data, e.g. to interpolate between existing samples. This provides an upsampling or super-resolution process.

The present disclosure makes use of a machine-learning algorithm to perform super-resolution or upsampling on the projection data. For instance, upsampling can be performed to increase the apparent radial sampling density and/or the angular sampling density. Approaches for generating or defining training data used for configuring/training such a machine-learning algorithm are also provided.

Figure 5:
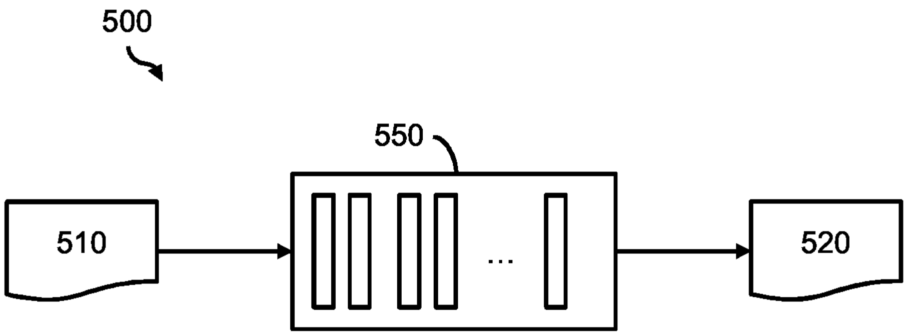
FIG. 5 illustrates a proposed approach.

FIG. 5 conceptually illustrates one approach 500 for using a machine-learning algorithm 550 according to an embodiment.

The machine-learning algorithm 550 is configured to receive, as input, projection data 510 generated by a computed tomography scanner. The machine-learning algorithm provides, as output, upsampled projection data 520. The upsampled projection data 520 has a higher resolution than the input projection data.

The machine-learning algorithm may be configured or trained to perform upsampling in a single direction respective to the projection data, e.g. in a radial direction or in an angular direction. In other examples, the machine-learning algorithm is configured or trained to perform upsampling in a plurality of directions, e.g. both radially and angularly.

More specifically, the machine-learning algorithm may be configured to generate a plurality of new samples for the projection data. For instance, with reference to FIG. 3 or 4, the machine-learning algorithm may be configured to generate a plurality of new samples that are positioned (in the rϕ-space) between existing or captured samples of the original projection data. Thus, a machine-learning algorithm is used to improve the resolution of the projection data. This in turn improves the resolution of image data generated from the projection data.

A machine-learning algorithm is any self-training algorithm that processes input data in order to produce or predict output data. Here, the input data comprises projection data and the output data comprises upsampled or higher resolution projection data.

Suitable machine-learning algorithms for being employed in the present invention will be apparent to the skilled person. Examples of suitable machine-learning algorithms include neural networks, logistic regression, support vector machines or Naïve Bayesian models. A neural network is a particularly effective approach for processing projection data.

The structure of a neural network (or, simply, neural network) is inspired by the human brain. Neural networks are comprised of layers, each layer comprising a plurality of neurons. Each neuron comprises a mathematical operation. In particular, each neuron may comprise a different weighted combination of a single type of transformation (e.g. the same type of transformation, sigmoid etc. but with different weightings). In the process of processing input data, the mathematical operation of each neuron is performed on the input data to produce a numerical output, and the outputs of each layer in the neural network are fed into the next layer sequentially. The final layer provides the output.

Methods of training a machine-learning algorithm are well known. Typically, such methods comprise obtaining a training dataset, comprising input training data entries and corresponding output training output data entries. In other words, the training dataset comprises a plurality of pairs of input training data entry and output training data entry.

An initialized machine-learning algorithm is then applied to each input data entry to generate predicted output data entries. An error between the predicted output data entries and corresponding training output data entries is used to modify the machine-learning algorithm. This process can be repeated until the error converges, and the predicted output data entries are sufficiently similar (e.g. ±1%) to the training output data entries. This is commonly known as a supervised learning technique.

For example, where the machine-learning algorithm is formed from a neural network, (weightings of) the mathematical operation of each neuron may be modified until the error converges. Known methods of modifying a neural network include gradient descent, backpropagation algorithms and so on.

Each input training data entries comprises example projection data or lower resolution projection data. Each output training data entries comprises higher resolution projection data, being an upsampled or higher resolution version of the example projection data or lower resolution projection data. Each input training data entry corresponds to an output training data entry and depicts a same scene or region.

In order to define the output training data entries, different instances of projection data are obtained. Each instance of obtained projection data acts as an output training data entry, i.e. as higher resolution projection data.

Each instance of projection data has been generated by a training computed tomography scanner that uses a dual focal spot acquisition technique, which has been previously described. Thus, each instance of projection data may be obtained from the training computer tomography scanner or from a memory that stores data generated from the training computer tomography scanner.

Thus, each instance of projection data used as output training data entries has been generated by the training computed tomography scanner by using a dual focal spot acquisition technique to generate intermediate data, the intermediate data comprising interleaved first sample sets and second sample sets, each sample set obtained using a different focal spot; and performing parallel binning on the interleaved first sample sets and second sample sets to generate the instance of projection data, i.e., an instance of high resolution projection data that acts as an output training data entry. This process is repeated multiple times to generate a plurality of output training data entries.

To generate the corresponding input training data entries, the process for generating the higher resolution projection data (representing the output training data entries) is modified. As previously described, a method of generating projection data using a dual focal spot acquisition technique uses a parallel rebinning technique to form, for a particular view, a projection data portion from two consecutive sample sets taken at the same view, but with different focal spot positions. To generate the lower resolution projection data, this parallel binning technique can be omitted, and instead only one of the two consecutive sample sets is used as the projection data portion for that particular view. This will effectively decrease the sampling density in a radial direction for the lower resolution projection data compared to the higher resolution projection data.

By way of further explanation, with reference to FIG. 4, the lower resolution projection data may contain only the first sample sets 401 or only the second sample sets 402, and the higher resolution projection data may contain the first sample sets 401 and the second sample sets 402.

This approach means that the machine-learning algorithm effectively simulates or acts as a dual focal spot acquisition technique. Using such a machine-learning algorithm to increase a resolution of projection data (in an inference stage) can thereby replace performance of dual focus acquisition.

Using a machine-learning algorithm trained using a training dataset is particularly advantageous when the computed tomography scanner, which generates the projection data, operates in a kVp switching mode. DFS is technically difficult to implement on a fast kVp switching system, such that use of such machine-learning algorithm would be particularly advantageous.

In some embodiments, the machine-learning algorithm may be further trained using a second training dataset. The second training dataset comprises a plurality of second input training data entries and a plurality of second output training data entries.

In a first and second example of such embodiments, each second output training data entry comprises an instance of projection data generated by a training computer tomography scanner (in a similar manner to the output training data entries of the training dataset). In a third example of such embodiments, each pair of input training data entry and output training data entry comprise image data of a particular scene—wherein for any given pair, the input training data entry may comprise lower resolution image data of the scene, and the output training data entry may comprise higher resolution image data of the scene.

In the first example, different instances of projection data are generated by a training computed tomography scanner. Thus, each instance of projection data may be obtained/received from the training computer tomography scanner or from a memory that stores data generated from the training computer tomography scanner. Each instance of obtained projection data may act as a second output training data entry. Each instance of obtained projection data may undergo a resolution reduction process, e.g. by applying a blurring kernel to each instance of obtained projection data. This produces corresponding instances of reduced resolution projection data that act as corresponding second input training data entries.

This first example can effectively simulate (for acting as second input training data entries) projection data that has a reduced resolution due to use of larger focal spot.

In the second example, different instances of projection data are similarly generated by a training computed tomography scanner. Thus, each instance of projection data may be obtained/received from the training computer tomography scanner or from a memory that stores data generated from the training computer tomography scanner. Each instance of obtained projection data may act as a second output training data entry. To generate the corresponding second input training data entries, the process for generating the projection data (representing the second output training data entries) can be modified. In particular, the projection data (for second output training data entries) may be generated by the training CT scanner by combining projection data portions obtained from a plurality of different views. To generate the lower resolution projection data for the corresponding second input training data entries, a similar generation process may be used, but where the combination of the projection data portions may be modified to omit, delete or remove projection data portions associated with a selection of one or more views, e.g. alternate views. For instance, only the projection data portions from every other view in a sequence of views may be used to generate the projection data for the second input training data entry.

Thus, the projection data for each second output training data entry may be generated by a generation process that comprises generating intermediate data for a plurality of views of the subject. The projection data for each second input training data entry may be generated by removing parts of the intermediate data corresponding to a selection of the plurality of views.

The approach adopted by the second example effectively reduces an angular sampling of the projection data to produce the lower resolution projection data. Correspondingly, a machine-learning algorithm that has been further trained with such an approach will increase the angular sampling of the projection data.

In the third example, each pair of second input training data entry and second output training data entry comprise image data of a particular scene. For any given pair, the second input training data entry may comprise lower resolution image data of the scene, and the second output training data entry may comprise higher resolution image data of the scene.

The image data may be non-projection image data, i.e., image data that has not been generated by a computed tomography scanner.

In an advantageous version of this third example, the lower and higher resolution image data may be greyscale, and values of different pixels in the image data may be constrained or scaled to a range of values that can be contained in projection data generated by a computed tomography scanner. A softmax function is one suitable function for modifying values of image data to fall within a range of values of projection data output by a computed tomography scanner.

This third example recognizes that a machine-learning algorithm that is trained to upsample or improve a resolution of image data can be directly adapted for upsampling or improving a resolution of projection data. This approach facilitates use of more accurate upsampling techniques, e.g. those that have been trained using an extremely large database of images. Such a large database, containing an equivalent amount of projection data, would be difficult and time consuming to acquire.

Moreover, the image data need not be projection data or even medical image data. Rather, it has been recognized that any trained super-resolution machine-learning method can be immediately applied to projection data and improve the apparent sampling of the projection data without significant loss of accuracy or resolution.

In any above example, noise may be added to the lower resolution projection data of the input training data entries (or second input training data entries). This effectively trains or configures a machine-learning algorithm trained using such modified training datasets to also perform a denoising technique. Thus, the machine-learning algorithm can be trained to perform joint resolution recovery and denoising.

The machine-learning method may be configured so that each new sample generated by the machine-learning method (in producing the upsampled projection data) is dependent upon a subset (i.e. not all) of the original samples of the projection data to be upsampled. Thus, the receptive field for a particular sample can be intentionally limited.

For instance, in some instances, each new sample may be dependent upon only a group of samples lying within a nearby or proximate region of the $r\phi$-space.

In some examples, the machine-learning method is designed such that, for any new sample produced by the machine-learning method, the receptive field contains only those samples of the projection data in the nearest two or nearest four sample sets of the projection data in the $r\phi$-space. Thus, if the new sample is to have a value #1 for angle $\phi$, then only the nearest two or four sample sets to this value will be used to produce the new sample.

Figure 6:
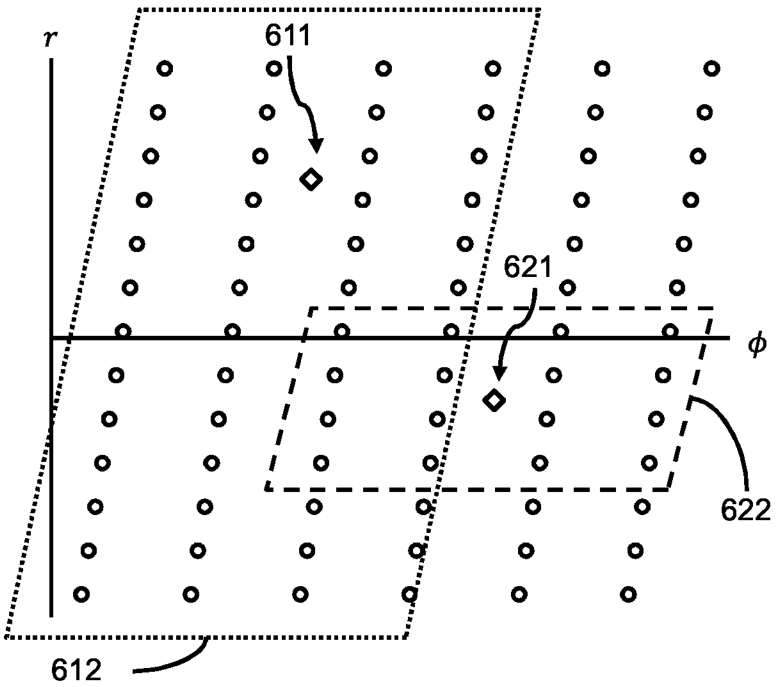
FIG. 6 illustrates example receptive fields for machine-learning methods used in proposed approaches.

This is conceptually illustrated in FIG. 6, which demonstrates how for a first new sample 611, the receptive field 612 may contain the nearest four sample sets. Other suitable sizes for the receptive field 612 are envisaged, e.g. the nearest two samples sets, the nearest six sample sets and so on. In such embodiments, the number of sample sets in the receptive field may be an even positive number to improve the balance of sample sets that contribute to the new sample.

As another example, the machine-learning method is designed such that, for any new sample produced by the machine-learning method, the receptive field contains only those samples of the projection data produced by a subset of the detectors of the detector array within the nearest two or nearest four sample sets of the projection data in the rϕ-space. Thus, if the new sample is to have a value $r_2$ for parameter r and a value $\phi_2$ for angle ϕ, then only the samples obtained by detectors that produced the nearest K neighboring values to $r_2$ for parameter r and for the nearest L sets to the value $\phi_2$ will be used to produce the new sample. The values of K and L may be equal or different, and are positive integer values (e.g. 2 or 4). The value of K and/or L may be an even positive number to improve the balance of sample sets that contribute to the new sample.

This is also conceptually illustrated in FIG. 6, which demonstrates how for a second new sample 621, the receptive field 622 may contain only nearby samples.

Thus, the machine-learning algorithm may be configured to generate a plurality of new samples for the projection data, wherein each new sample is generated from a different subset of the plurality of samples, wherein the subset comprises only those samples for which: an absolute difference between the value for parameter r of the sample and the value for parameter r of the new sample falls below a first predetermined threshold; and/or an absolute difference between for the value of angle ϕ of the sample and the value of angle ϕ of the new sample falls below a second predetermined threshold.

The first predetermined threshold effectively limits the number of detectors that contribute to the generation of the new sample. In particular, each new sample may be mapped to an effective detector position within the detector array, and the first predetermined threshold may define the number of neighboring detectors to the effective detector position that contribute to the generation of the new sample.

The second predetermined threshold effectively limits the number of samples sets, i.e. samples at different projection views, that contribute to the generation of the new sample. In particular, each sample may be mapped to an effective sample set, and the second predetermined threshold may define the number of neighboring sample sets to the effective sample set that contribute to the generation of the new sample.

Figure 7:
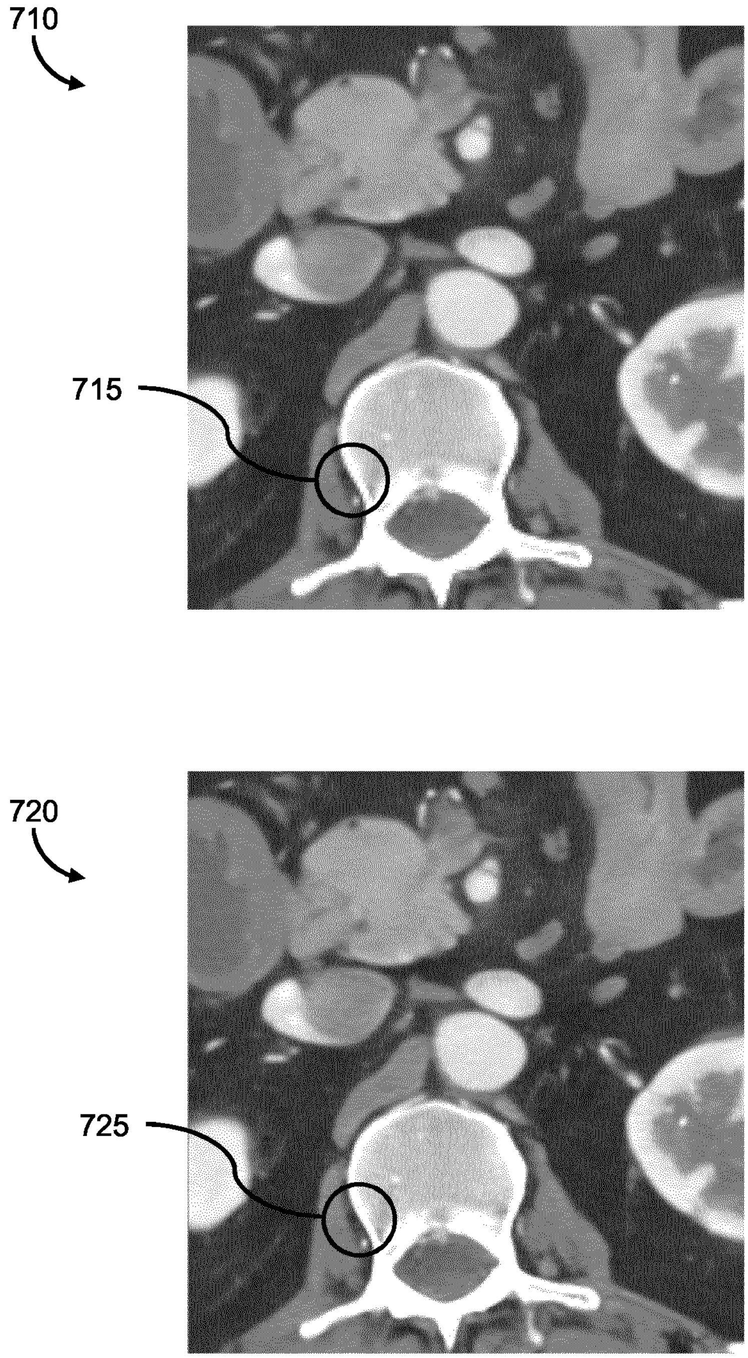
FIG. 7 illustrates an effect of proposed approaches.

FIG. 7 illustrates an effect of a machine-learning algorithm that has been trained using a training dataset generated according to the fourth example described above.

A first CT image 710 represents image data generated from projection data that has not undergone processing by such a machine-learning algorithm. A second CT image 720 represents image data generated from projection data that has undergone processing by such a machine-learning algorithm.

It can be clearly identified that the second CT image is of a better resolution that the first CT image. This provides potentially valuable information for aiding a clinician in diagnosing or assessing the condition of an imaged subject.

For instance, an identified portion 725 of the second CT image exhibits less aliasing than the equivalent portion 715 (illustrating the same feature/element) of the first CT image. This clearly demonstrates how a resolution and image quality of image data has been improved through approaches disclosed herein.

Figure 8:
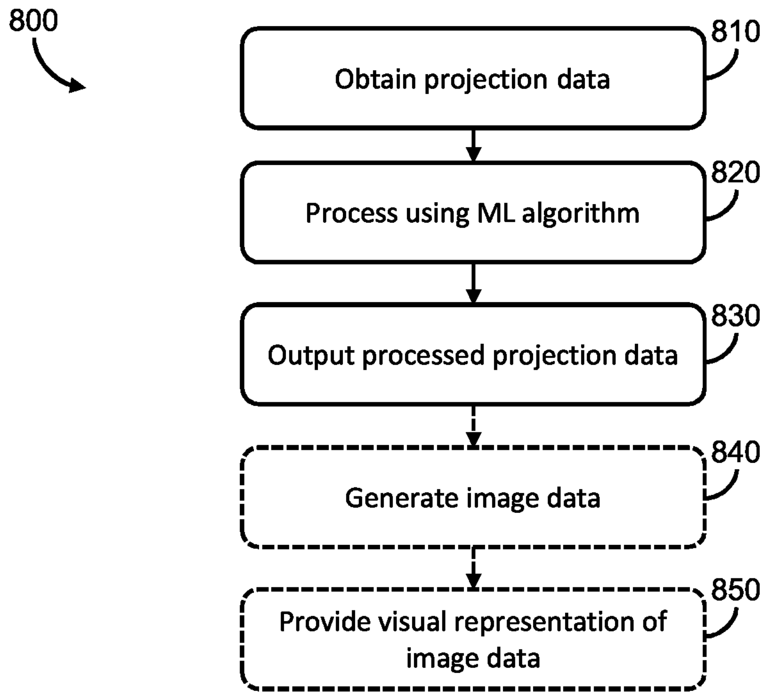
FIG. 8 illustrates a method.

FIG. 8 illustrates a method 800 according to an embodiment.

The method 800 comprises a step 810 of obtaining the projection data generated by the computed tomography scanner.

Step 810 may comprise using the computed tomography scanner to generate the projection data. In other examples, step 810 may comprise obtaining the projection data from a memory or storage unit, e.g. which stores projection data previously generated by the computed tomography scanner.

The method 800 also comprises a step 820 of processing the projection data using a machine-learning (ML) algorithm configured to perform a super-resolution imaging technique on the projection data, to increase the apparent sampling of the projection data in at least one dimension.

The method 800 further comprises a step 830 of outputting the processed projection data.

In some examples, the method 800 may further comprise a step 840 of generating image data from the output and processed projection data. Approaches for generating image data from projection data are well established in the art and may use a backpropagation technique.

The method 800 may further comprise a step 850 of providing a visual representation of the generated image data. This may comprise controlling a user interface, such as a display, to provide a visual representation of the image data.

Various approaches for training a machine-learning method have been herein described, namely using a training dataset in order to train the machine-learning method. Approaches for generating the training dataset have been described. The skilled person would therefore be readily capable of configured a computer-implemented method for generating a training dataset for use in the present invention.

Accordingly, there is also proposed a computer-implemented method of generating a training dataset for training a machine-learning algorithm is perform a super-resolution imaging technique on projection data generated by a computed tomography scanner.

The computer-implemented method comprises generating an output training dataset, formed of a plurality of output training data entries that each comprise high resolution projection data of an imaged subject, for the training dataset by: receiving intermediate data generated by a training computed tomography scanner that uses a dual focal spot acquisition technique to generate the intermediate data, the intermediate data comprising interleaved first sample sets and second sample sets, each sample set obtained using a different focal spot; and performing parallel binning on the interleaved first sample sets and second sample sets to generate the high resolution projection data; and generating an input training dataset formed of a plurality of input training data entries, each input training data entry corresponding to a respective output training data entry and comprising low resolution image projection data of the same image subject of the respective output training data entry.

The skilled person would be readily capable of configuring a processing system for performing any herein described method or approach. Thus, each block in any illustrated flowchart may represent a module of or process performed by a processing system.

In some examples, such a processing system is integrated into reconstruction apparatus of an imaging system, such as that illustrated in FIG. 1. The imaging system may further include a computed tomography scanner.

Figure 9:
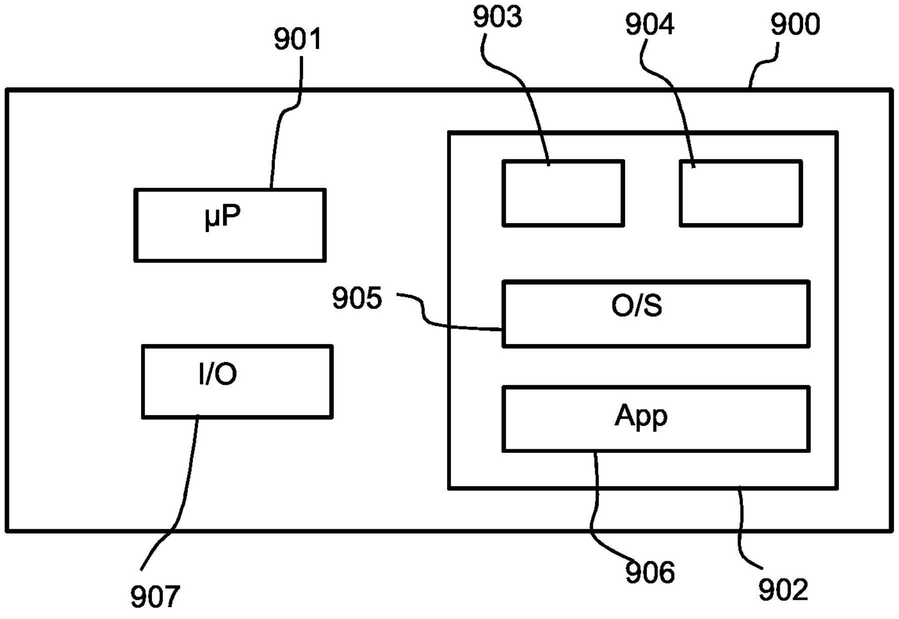
FIG. 9 illustrates a processing system.

By way of further example, FIG. 9 illustrates an example of a processing system 900 within which one or more parts of an embodiment may be employed. The processing system 900 may form part of a reconstruction apparatus and/or an imaging system.

Various operations discussed above may utilize the capabilities of the processing system 900. For example, one or more parts of a system for performing a super-resolution technique on projection data may be incorporated in any element, module, application, and/or component discussed herein. In this regard, it is to be understood that system functional blocks can run on a single computer or may be distributed over several computers and locations, e.g. connected via the internet.

The processing system 900 includes, but is not limited to, PCs, workstations, laptops, PDAs, palm devices, servers, storages, and the like. Generally, in terms of hardware architecture, the processing system 900 may include one or more processors 901, memory 902, and one or more I/O devices 907 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 901 is a hardware device for executing software that can be stored in the memory 902. The processor 901 can be virtually any custom made or commercially available processor, a central processing unit (CPU), a digital signal processor (DSP), or an auxiliary processor among several processors associated with the processing system 900, and the processor 901 may be a semiconductor based microprocessor (in the form of a microchip) or a microprocessor.

The memory 902 can include any one or combination of volatile memory elements (e.g., random access memory (RAM), such as dynamic random access memory (DRAM), static random access memory (SRAM), etc.) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 902 may incorporate electronic, magnetic, optical, and/or other types of storage media. Note that the memory 902 can have a distributed architecture, where various components are situated remote from one another, but can be accessed by the processor 901.

The software in the memory 902 may include one or more separate programs, each of which comprises an ordered listing of executable instructions for implementing logical functions. The software in the memory 902 includes a suitable operating system (O/S) 905, compiler 904, source code 903, and one or more applications 906 in accordance with exemplary embodiments. As illustrated, the application 906 comprises numerous functional components for implementing the features and operations of the exemplary embodiments. The application 906 of the processing system 900 may represent various applications, computational units, logic, functional units, processes, operations, virtual entities, and/or modules in accordance with exemplary embodiments, but the application 906 is not meant to be a limitation.

The operating system 905 controls the execution of other computer programs, and provides scheduling, input-output control, file and data management, memory management, and communication control and related services. It is contemplated by the inventors that the application 906 for implementing exemplary embodiments may be applicable on all commercially available operating systems.

Application 906 may be a source program, executable program (object code), script, or any other entity comprising a set of instructions to be performed. When a source program, then the program is usually translated via a compiler (such as the compiler 904), assembler, interpreter, or the like, which may or may not be included within the memory 902, so as to operate properly in connection with the O/S 905. Furthermore, the application 906 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, JavaScript, FORTRAN, COBOL, Perl, Java, ADA, .NET, and the like.

The I/O devices 907 may include input devices such as, for example but not limited to, a mouse, keyboard, scanner, microphone, camera, etc. Furthermore, the I/O devices 907 may also include output devices, for example but not limited to a printer, display, etc. Finally, the I/O devices 907 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 907 also include components for communicating over various networks, such as the Internet or intranet.

If the processing system 900 is a PC, workstation, intelligent device or the like, the software in the memory 902 may further include a basic input output system (BIOS) (omitted for simplicity). The BIOS is a set of essential software routines that initialize and test hardware at startup, start the O/S 905, and support the transfer of data among the hardware devices. The BIOS is stored in some type of read-only-memory, such as ROM, PROM, EPROM, EEPROM or the like, so that the BIOS can be executed when the processing system 900 is activated.

When the processing system 900 is in operation, the processor 901 is configured to execute software stored within the memory 902, to communicate data to and from the memory 902, and to generally control operations of the processing system 900 pursuant to the software. The application 906 and the O/S 905 are read, in whole or in part, by the processor 901, perhaps buffered within the processor 901, and then executed.

When the application 906 is implemented in software it should be noted that the application 906 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 906 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

It will be understood that disclosed methods are preferably computer-implemented methods. As such, there is also proposed the concept of a computer program comprising code means for implementing any described method when said program is run on a processing system, such as a computer. Thus, different portions, lines or blocks of code of a computer program according to an embodiment may be executed by a processing system or computer to perform any herein described method. In some alternative implementations, the functions noted in the block diagram(s) or flow chart(s) may occur out of the order noted in the Figures. For example, two blocks shown in succession may, in fact, be executed substantially concurrently, or the blocks may sometimes be executed in the reverse order, depending upon the functionality involved.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. If a computer program is discussed above, it may be stored/distributed on a suitable medium, such as an optical storage medium or a solid-state medium supplied together with or as part of other hardware, but may also be distributed in other forms, such as via the Internet or other wired or wireless telecommunication systems. If the term "adapted to" is used in the claims or description, it is noted the term "adapted to" is intended to be equivalent to the term "configured to". Where the term "one or more" is used, this is intended to be equivalent to the term "at least one", and vice versa. Any reference signs in the claims should not be construed as limiting the scope.

The invention claimed is:

1. A computer-implemented method of processing projection data generated by a computed tomography scanner, the computer-implemented method comprising:

obtaining the projection data generated by the computed tomography scanner;

processing the projection data using a machine-learning algorithm configured to perform a super-resolution imaging technique on the projection data, to increase the apparent sampling of the projection data in at least one dimension; and outputting the processed projection data wherein:

the machine-learning algorithm is trained using a training dataset, the training dataset comprising:

an input training dataset formed of a plurality of input training data entries that each comprise low resolution projection data of an imaged subject; and an output training dataset formed of a plurality of output training data entries, each output training data entry corresponding to a respective input training data entry, and comprising high resolution projection data of the same imaged subject of the respective input training data entry;

wherein the high resolution projection data of each output training data entry is generated by a training computed tomography scanner that generates high resolution projection data by:

using a dual focal spot acquisition technique to generate the intermediate data, the intermediate data comprising interleaved first sample sets and second sample sets, each sample set obtained using a different focal spot; and performing parallel binning on the interleaved first sample sets and second sample sets to generate the high resolution projection data, and wherein the low resolution projection data is generated by discarding the first sample sets or the second sample sets of the intermediate data.

2. The computer-implemented method of claim 1, wherein the projection data is generated by the computed tomography scanner using a dual focal spot acquisition approach.

3. The computer-implemented method of claim 1, wherein the machine-learning algorithm is further trained using a modified training dataset, the modified training data set comprising:

a modified input training dataset, in which noise is added to the low resolution projection data of each input training data entry of the training dataset; and the output training dataset of the training dataset.

4. The computer-implemented method of claim 1, wherein the machine-learning algorithm is further trained using a second training dataset, the second training dataset comprising:

a second input training dataset formed of a plurality of second input training data entries that each comprise low-resolution image data of a scene; and a second output training dataset formed of a plurality of second output training data entries, each second output training data entry corresponding to a respective second input training data entry, and comprising high-resolution image data of the same scene of the respective second input training data entry.

5. The computer-implemented method of claim 4, wherein the values of the low-resolution image data and the high-resolution image data are scaled to correspond to a range of possible values for projection data generated by the computed tomography scanner.

6. The computer-implemented method of claim 1, wherein:

the projection data comprises a plurality of samples, each associated with a different combination of values for a parameter and an angle;

the parameter represents a smallest distance between an iso-center of the computed tomography scanner and a ray of radiation used by the computed tomography scanner to generate the sample;

the angle represents an angle between the ray of radiation used by the computed tomography scanner to generate the sample and a predefined plane;

the machine-learning algorithm is configured to generate a plurality of new samples for the projection data; and each new sample is generated from a different subset of the plurality of samples, wherein the subset comprises only those samples for which:

an absolute difference between the value for parameter of the sample and the value for parameter of the new sample falls below a first predetermined threshold; and/or an absolute difference between the value of angle of the sample and the value of angle of the new sample falls below a second predetermined threshold.

7. A computer-implemented method of generating a training dataset for training a machine-learning algorithm is perform a super-resolution imaging technique on projection data generated by a computed tomography scanner, the computer-implemented method comprising:

generating an output training dataset, formed of a plurality of output training data entries that each comprise high resolution projection data of an imaged subject, for the training dataset by:

receiving intermediate data generated by a training computed tomography scanner that uses a dual focal spot acquisition technique to generate the intermediate data, the intermediate data comprising interleaved first sample sets and second sample sets, each sample set obtained using a different focal spot; and performing parallel binning on the interleaved first sample sets and second sample sets to generate the high resolution projection data; and generating an input training dataset formed of a plurality of input training data entries, each input training data entry corresponding to a respective output training data entry and comprising low resolution image projection data of the same image subject of the respective output training data entry, by discarding the first sample sets or the second sample sets of the intermediate data.

8. The computer-implemented method of claim 7, wherein generating an output training dataset further comprises controlling the training computer tomography using a dual focal spot acquisition technique to generate the intermediate data.

9. A processing system for processing projection data generated by a computed tomography scanner, the processing system comprising:

a memory that stores a plurality of instructions; and a processor coupled to the memory and configured to execute the plurality of instructions to carry out a method comprising:

obtaining the projection data generated by the computed tomography scanner;

processing the projection data using a machine-learning algorithm configured to perform a super-resolution imaging technique on the projection data, to increase the apparent sampling of the projection data in at least one dimension; and outputting the processed projection data, wherein:

the machine-learning algorithm is trained using a training dataset, the training dataset comprising:

an input training dataset formed of a plurality of input training data entries that each comprise low resolution projection data of an imaged subject; and an output training dataset formed of a plurality of output training data entries, each output training data entry corresponding to a respective input training data entry, and comprising high resolution projection data of the same imaged subject of the respective input training data entry;

wherein the high resolution projection data of each output training data entry is generated by a training computed tomography scanner that generates high resolution projection data by:

using a dual focal spot acquisition technique to generate the intermediate data, the intermediate data comprising interleaved first sample sets and second sample sets, each sample set obtained using a different focal spot; and performing parallel binning on the interleaved first sample sets and second sample sets to generate the high resolution projection data, and wherein the low resolution projection data is generated by discarding the first sample sets or the second sample sets of the intermediate data.

10. The processing system of claim 9, wherein the projection data is generated by the computed tomography scanner using a dual focal spot acquisition approach.

11. The processing system of claim 9, wherein the machine-learning algorithm is further trained using a modified training dataset, the modified training data set comprising:

a modified input training dataset, in which noise is added to the low resolution projection data of each input training data entry of the training dataset; and the output training dataset of the training dataset.

12. The processing system of claim 9, wherein the machine-learning algorithm is further trained using a second training dataset, the second training dataset comprising:

a second input training dataset formed of a plurality of second input training data entries that each comprise low resolution image data of a scene; and a second output training dataset formed of a plurality of second output training data entries, each second output training data entry corresponding to a respective second input training data entry, and comprising high resolution image data of the same scene of the respective second input training data entry.

13. The processing system of claim 12, wherein the values of the low-resolution image data and the high-resolution image data are scaled to correspond to a range of possible values for projection data generated by the computed tomography scanner.

* * * * *